US009479823B2

(12) United States Patent
Busch et al.

(10) Patent No.: US 9,479,823 B2
(45) Date of Patent: Oct. 25, 2016

(54) TRANSMITTING DEVICE AND RECEIVING DEVICE

(75) Inventors: Hans-Juergen Busch, Buechenbach (DE); Rainer Bauereiss, Baiersdorf (DE); Thomas Huber, Nuremberg (DE)

(73) Assignee: ROBERT BOSCH GMBH, Stuttgart (DE)

(*) Notice: Subject to any disclaimer, the term of this patent is extended or adjusted under 35 U.S.C. 154(b) by 2982 days.

(21) Appl. No.: 11/607,622

(22) Filed: Dec. 1, 2006

(65) Prior Publication Data

US 2007/0263717 A1 Nov. 15, 2007

(30) Foreign Application Priority Data

Dec. 2, 2005 (DE) .................. 10 2005 057 568

(51) Int. Cl.
*H04N 11/04* (2006.01)
*H04N 21/434* (2011.01)
*H04N 19/159* (2014.01)
*H04N 19/172* (2014.01)
*H04N 19/61* (2014.01)
*H04N 19/107* (2014.01)
*H04N 19/40* (2014.01)

(52) U.S. Cl.
CPC ........ *H04N 21/4344* (2013.01); *H04N 19/107* (2014.11); *H04N 19/159* (2014.11); *H04N 19/172* (2014.11); *H04N 19/40* (2014.11); *H04N 19/61* (2014.11)

(58) Field of Classification Search
CPC ........... H04N 21/4344; H04N 19/159; H04N 19/172; H04N 19/61; H04N 19/107; H04N 19/40
USPC ............................ 375/240.1, 240.01, 240.26
See application file for complete search history.

(56) References Cited

U.S. PATENT DOCUMENTS

| 5,892,882 | A | 4/1999 | Kuroda et al. |
| 5,907,660 | A * | 5/1999 | Inoue .................. H04N 5/783 375/E7.273 |
| 6,445,738 | B1 | 9/2002 | Zdepski et al. |
| 6,628,890 | B1 * | 9/2003 | Yamamoto ............. H04N 7/16 348/E7.054 |
| 7,284,072 | B2 * | 10/2007 | Pai et al. .................... 710/22 |
| 7,460,601 | B2 * | 12/2008 | Taniguchi ............... 375/240.26 |
| 2003/0093810 | A1 * | 5/2003 | Taniguchi ....... G08B 13/19656 725/112 |
| 2003/0229901 | A1 * | 12/2003 | Amir ................ H04N 7/17318 725/95 |
| 2004/0034870 | A1 * | 2/2004 | O'Brien ........... H04N 7/17336 725/88 |
| 2004/0179825 | A1 * | 9/2004 | Im .................... H04N 5/783 386/220 |
| 2004/0210948 | A1 | 10/2004 | Jin et al. |
| 2005/0097614 | A1 * | 5/2005 | Pedlow ............. H04N 7/17318 725/90 |

(Continued)

FOREIGN PATENT DOCUMENTS

| AU | WO 0131497 A1 * | 5/2001 | ....... G06F 17/30017 |
| NL | WO 03107666 A1 * | 12/2003 | ....... G11B 20/00086 |

(Continued)

*Primary Examiner* — Christopher S Kelley
*Assistant Examiner* — Zhihan Zhou
(74) *Attorney, Agent, or Firm* — Norton Rose Fulbright US LLP

(57) ABSTRACT

A transmitting device, a receiving device, and a method for transmitting and a method for receiving data streams, in particular video streams, are described. The transmitting device for data streams, in particular video data, has at least one unit. This at least one unit is designed for subdividing the data streams into sections, the sections into packets, and for providing the sections in a sequence that is the reverse of an original sequence and the packets in an original sequence.

16 Claims, 1 Drawing Sheet

(56) References Cited

U.S. PATENT DOCUMENTS

2005/0180568 A1* 8/2005 Krause ............ H04N 21/23608
   380/212
2006/0075440 A1* 4/2006 Rijckaert ......... G11B 20/00086
   725/88
2007/0005795 A1* 1/2007 Gonzalez .......... G06F 17/30017
   709/232

FOREIGN PATENT DOCUMENTS

| WO | WO 8201784 A | * | 5/1982 |
| WO | WO 01/37572 A1 | | 5/2001 |
| WO | WO 03/107666 | | 12/2003 |
| WO | 2004/071091 A1 | | 8/2004 |

* cited by examiner

TRANSMITTING DEVICE AND RECEIVING DEVICE

RELATED APPLICATION INFORMATION

The present application is based on priority German patent application no. 10 2005 057 568.4, which was filed in Germany on Dec. 2, 2005, and the disclosure of the foregoing German patent application is incorporated herein by reference.

FIELD OF THE INVENTION

The present invention relates to a transmitting device for data streams, a receiving device for data streams, a method for transmitting and a method for receiving data streams, as well as a computer program and a computer program product.

BACKGROUND INFORMATION

In order to reduce the data rates in video data, such video data are compressed using an intra-frame coding method. A data rate reduction is mainly achieved by decoding only the differences between an image and a preceding image. This procedure results in the image being able to be decoded only if the preceding image has previously been decoded. Intra frames are introduced into a video stream in time intervals, these intra frames not referring to any predecessor and therefore being able to be decoded independently.

Video streams or data streams are usually transmitted within networks as packets, each packet containing a number of encoded data bytes. Each packet has a sequence number, so that a receiver may check the data stream for consistency. The streaming and decoding of an encoded data stream in the forward direction is a straightforward procedure. A decoder must wait for the arrival of a first intra frame in order to be able to decode all subsequent images from this point in time on.

Specifications or embodiments using this method include, for example, MPEG 2, MPEG 4 and the "Realtime Streaming Protocol." These are defined by IETF, the Internet Engineering Task Force, an international organization of network specialists, in "RFC 3550," a transmission protocol for real-time applications. An encoded video or encoded video data may be stored on a memory medium and replayed at a later point in time. The streaming of stored media data or video data in the forward direction to a remote customer is a straightforward method. However, the streaming, i.e., transmitting, of packets in a reverse, backward sequence is more complicated.

U.S. Pat. No. 5,892,882 discusses a motion picture encoding system for a memory medium which processes digital motion pictures. Furthermore, that document relates to a method for decoding and reproducing motion pictures for a special reproduction mode such as reverse reproduction. This encoding system requires little memory space and performs both decoding and reproduction at a low speed.

International Patent Document WO 01/37572 A1 discusses a method for decoding video data streams encoded according to the MPEG format which are received in a forward reproduction sequence. Decoded images which are to be replayed in a reverse sequence are produced from these video data streams. For this purpose, a limited number of decoded frames is stored for a time period, the same encoded image data being retrieved in a forward-directed reproduction to produce decoded image data using the stored frames.

U.S. Pat. No. 6,445,738 discusses a system and a method for generating trick reproduction video data streams from a compressed normal reproduction video data stream. In this case, interceded video data streams are recoded into intra-coded video data streams.

SUMMARY OF THE INVENTION

The exemplary embodiment and/or exemplary method of the present invention relates to a transmitting device having the features described herein in the context of the claimed subject matter, a receiving device having the features described herein in the context of the claimed subject matter, a method having the features described herein, a method having the features described herein in the context of the claimed subject matter, a computer program having the features described herein in the context of the claimed subject matter, and a computer program product having the features described herein in the context of the claimed subject matter.

The transmitting device for data streams, in particular for video data, according to the exemplary embodiment and/or exemplary method of the present invention has at least one unit which is designed for subdividing the data streams into sections and the sections into packets. The at least one unit provides the sections in a sequence that is the reverse of an original sequence and the packets in an original sequence.

The receiving device for data streams, in particular for video data, according to the exemplary embodiment and/or exemplary method of the present invention has at least one module. The data streams which are to be received by the receiving device are subdivided into sections and these sections into packets; in addition, the sections have a sequence which is the reverse of an original sequence, and the packets have an original sequence. The at least one module of the receiving device is designed for providing images of a section in a reverse sequence.

In addition, the exemplary embodiment and/or exemplary method of the present invention relates to a method for transmitting data streams, in particular video data. The video data are subdivided into sections and the sections into packets. The sections are provided in a sequence that is the reverse of an original sequence and the packets in an original sequence.

The exemplary embodiment and/or exemplary method of the present invention furthermore relates to a method for receiving data streams, in particular video data, the received data streams being subdivided into sections and these sections into packets, and the sections having a sequence which is the reverse of an original sequence, and the packets having an original sequence. Images of a section are provided in a reverse sequence in the method.

The computer program according to the exemplary embodiment and/or exemplary method of the present invention having a program code arrangement is provided for executing all steps of the method according to the exemplary embodiment and/or exemplary method of the present invention for transmitting video streams and/or all steps of a method according to the exemplary embodiment and/or exemplary method of the present invention for receiving data streams when the computer program is executed on a computer or on a corresponding computer unit, in particular in a transmitting device according to the exemplary embodiment and/or exemplary method of the present invention and/or in a receiving device according to the exemplary embodiment and/or exemplary method of the present invention.

The computer program product according to the exemplary embodiment and/or exemplary method of the present invention having a program code arrangement stored on a computer-readable data medium is designed for executing all steps of the method according to the exemplary embodiment and/or exemplary method of the present invention for transmitting video streams and/or all steps of a method according to the exemplary embodiment and/or exemplary method of the present invention for receiving data streams when the computer program is executed on a computer or on a corresponding computer unit, in particular in a transmitting device according to the exemplary embodiment and/or exemplary method of the present invention and/or in a receiving device according to the exemplary embodiment and/or exemplary method of the present invention.

Advantageous embodiments are described herein. The method according to the exemplary embodiment and/or exemplary method of the present invention for transmitting data streams and thus media data is typically executable by the transmitting device according to the exemplary embodiment and/or exemplary method of the present invention. The method according to the exemplary embodiment and/or exemplary method of the present invention for transmitting data streams may include additional advantageous steps, which result from a use of the described transmitting device according to the exemplary embodiment and/or exemplary method of the present invention. The method according to the exemplary embodiment and/or exemplary method of the present invention for receiving data streams and thus media data is typically executable by the receiving device according to the exemplary embodiment and/or exemplary method of the present invention. The method according to the exemplary embodiment and/or exemplary method of the present invention for receiving data streams may include additional advantageous steps, which result from a use of the described receiving device according to the exemplary embodiment and/or exemplary method of the present invention.

The method according to the exemplary embodiment and/or exemplary method of the present invention for transmitting data streams and the method according to the exemplary embodiment and/or exemplary method of the present invention for receiving data streams may supplement each other when suitably executed, so that the method according to the exemplary embodiment and/or exemplary method of the present invention for transmitting data streams and the method according to the exemplary embodiment and/or exemplary method of the present invention for receiving data streams combined form one method for handling data streams and thus of video data.

In addition, the transmitting device according to the exemplary embodiment and/or exemplary method of the present invention and the receiving device according to the exemplary embodiment and/or exemplary method of the present invention may supplement each other, in particular when executing a method for handling, such as streaming, and/or transmitting, data streams. The media data provided by the transmitting device according to the exemplary embodiment and/or exemplary method of the present invention may thus be transmitted to the receiving device according to the exemplary embodiment and/or exemplary method of the present invention and may be provided by this receiving device according to the exemplary embodiment and/or exemplary method of the present invention and thus made available to a user.

Using a transmission device including the transmitting device and the receiving device it is possible to both transmit and receive the data streams according to the exemplary embodiment and/or exemplary method of the present invention. At least one transmitting device and at least one receiving device may be connected over a network, in particular an IP (Internet protocol) network. Data streams may be transmitted between the at least one transmitting device and the at least one receiving device via such a network.

The transmitting device according to the exemplary embodiment and/or exemplary method of the present invention within the transmission device may have a memory device or a memory medium, a packet assembling device, and/or a transmitting module as the at least one unit. The memory device is designed for storing compressed videos or video data in particular. The packet assembling device subdivides the compressed video data into sections and then the sections into packets. The transmitting module is designed for transmitting the sections in the reverse sequence, while preserving the original sequence of the packets.

In a possible embodiment of the transmission device, the receiving device according to the exemplary embodiment and/or exemplary method of the present invention includes a receiving module, a decoder, an image buffer, and/or a display module as the at least one module. The receiving module receives the available video data in sections and packets. The decoder decodes these video data; the image buffer stores decoded images of the video data of at least one section, and the display module displays these images in a reverse sequence.

The above-mentioned sequences may be chronological or systematic sequences resulting from a possibly hierarchical arrangement of packets and sections of the data streams or video data. Accordingly, the transmitting device is designed for arranging the sections in a reverse sequence, the sequence of the packets remaining unchanged. The receiving device, when it receives video data including these sections and packets from the transmitting device, may provide a sequence of images which may be derived from packets of these received video data, which may be in a reverse sequence relative to the received sequence.

Reverse streaming, i.e., reverse transmission, of compressed video data to a remote user is thus provided by the exemplary embodiment and/or exemplary method of the present invention. The original video data are modified by the transmitting device in such a way that transmission of the video data at a high rate and requiring low transmission capacities is possible. The receiving device, to be considered the counterpart of the transmitting device, is suitable for providing the modified video data in a sufficiently high quality and thus making them available to the user.

An additional unit, which may be included in the transmitting module of the transmitting device, assigns an index denoting the original sequence to all packets. An index belonging to a particular packet is transmitted by the transmitting module together with the particular packet.

A detection unit in the receiving module of the receiving device is designed for checking the completeness of a section by comparing an index of a packet with the index of a first packet of a previous section.

Both the transmitting device and the receiving device may be used in a CCTV (closed-circuit TV) application, i.e., in a monitoring system or a video monitoring system.

Further advantages and embodiments of the exemplary embodiment and/or exemplary method of the present invention are disclosed by the description herein and the drawings.

It is understood that the above-named features to be elucidated below are usable not only in the given combination, but also in other combinations or by themselves without leaving the scope of the present invention.

DETAILED DESCRIPTION

Figure 1:
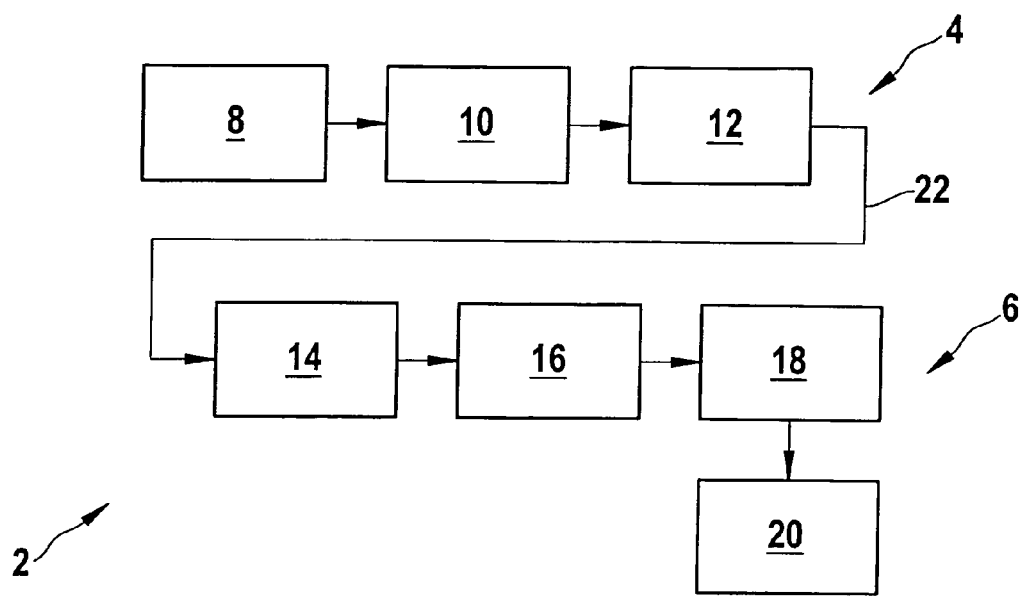
FIG. 1 shows an embodiment of a transmitting device according to the exemplary embodiment and/or exemplary method of the present invention and a receiving device according to the exemplary embodiment and/or exemplary method of the present invention.

FIG. 1 schematically shows a transmission device, or system 2, which includes a transmitting device 4 according to the exemplary embodiment and/or exemplary method of the present invention and a receiving device 6 according to the exemplary embodiment and/or exemplary method of the present invention. Transmitting device 4 has a memory device 8, a packet assembling device 10, and a transmitting module 12. Receiving device 6 has a receiving module 14, a decoder 16, an image buffer 18, and a display module 20.

Transmitting device 4 and its individual units are spatially separated from receiving device 6 and its individual modules. Data streams, media data, and thus also video data may be transmitted 22 between transmitting device 4 and receiving device 6 either in a wireless or a wire-bound manner.

Memory device 8 for storing compressed video data is located within transmitting device 4. Packet assembling device 10 divides these compressed video data into sections and the sections into packets. The packets and thus also the sections are transmitted by transmitting module 12. The sections are arranged in a reverse sequence; however, the packets are arranged in an unchanged, original sequence.

During transmission 22, the sections containing the packets, resulting from the compressed video data and modified in their sequence, are transmitted by transmitting module 12 and received by receiving module 14.

Within receiving device 6, the video data received by the receiving module 14 and thus the sections including the packets are decoded by decoder 16 and stored in image buffer 18, which is designed for holding a plurality of images. The images of one section are displayed by display module 20 in a reverse sequence.

Figure 2:
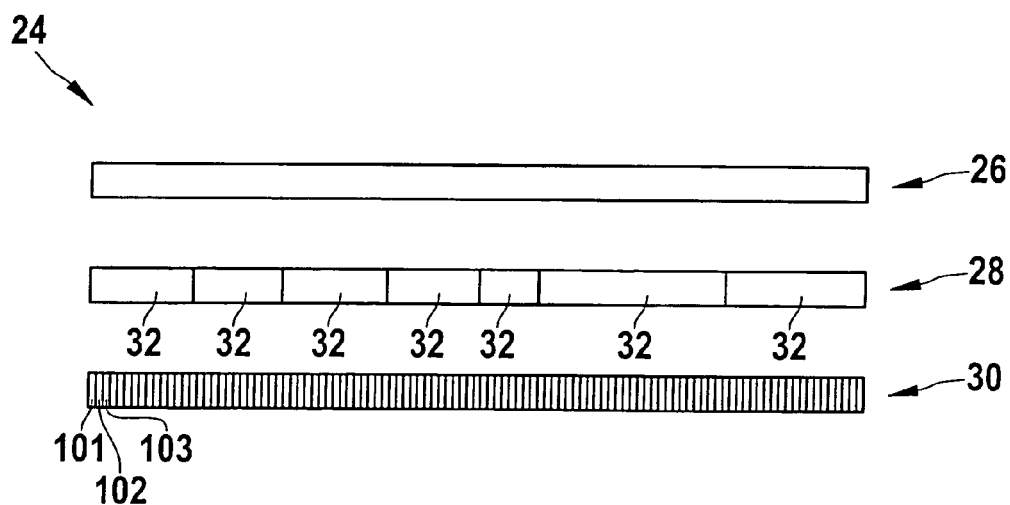
FIG. 2 shows an example of a subdivision of video data.

FIG. 2 schematically shows three data streams 26, 28, 30 of video data 24, subdivided, i.e., structured, differently. An original, unmodified data stream 26 of video data 24, a sectioned data stream 28 of video data 24, and a packed data stream 30 of video data 24 are shown in FIG. 2 one above the other.

Sectioned data stream 28 of video data 24 is subdivided into sections 32, which are arranged one after another or one behind the other according to a sequence. Each section 32 begins with an intra frame. In the case of packed data stream 30 of video data 24, sections 32 of sectioned data stream 28 and thus also original data stream 26 are divided or subdivided into packets 101, 102, 103, FIG. 2 showing only reference numerals 101, 102, 103 of the first three packets for the sake of clarity.

Within packed data stream 30, packets 101, 102, 103 are provided with numbers increasing from left to right, which in the present example correspond to the last digits of the reference numerals. In the transmission of video data 24 according to the exemplary embodiment and/or exemplary method of the present invention, reverse video data 24 are transferred by providing, i.e., transmitting, sections 32 in a reverse sequence compared to the original sequence. Packets 101, 102, 103 are transmitted in an original sequence, each packet 101, 102, 103 being provided with a sequence number.

What is claimed is:

1. A transmitting device for transmitting data streams, comprising:
    at least one unit having:
        a subdividing arrangement to subdivide the data streams into sections and to subdivide the sections into packets; and
        an arrangement to provide these sections in a sequence that is the reverse of an original sequence and the packets in an original sequence;
    wherein the at least one unit includes:
        a memory unit;
        a packet assembling device; and
        a transmitting module, wherein video data is storable in the memory unit, wherein the packet assembling device is operable to subdivide the video data into sections and to subdivide the sections into packets, and wherein the transmitting module is operable to transmit the sections in a sequence that is the reverse of an original sequence and to transmit the packets in an original sequence; and
        wherein an index characterizing a sequence is assigned to each packet, wherein the transmitting module is operable to transmit a corresponding index with each packet;
        wherein an index of one of the packets is compared with another index of one of the packets of a previous one of the sections to check a completeness of the one of the sections when it is received.

2. The transmitting device of claim 1, wherein the transmitting device is integrated into a video monitoring system.

3. The transmitting device of claim 1, wherein the data streams include video data.

4. The transmitting device of claim 1,
    wherein the transmitting device is integrated into a video monitoring system, and wherein the data streams include video data.

5. A receiving device for receiving data streams, comprising:
    at least one module to receive data streams and to subdivide the received data streams into sections and to subdivide the sections into packets, the sections have a sequence which is the reverse of an original sequence, and the packets have an original sequence, wherein the at least one module is operable to provide images of one of the sections in a reverse sequence, the at least one module including a receiving module, a decoder, an image buffer, and a display module, wherein the receiving module is operable to receive video data, the decoder is operable to decode the video data, the image buffer is operable to store images of one of the sections, and the display module is operable to display the images in a reverse sequence, wherein the index characterizing a sequence is assigned to each packet, and a corresponding index is transmitted with each packet; and
    a detection unit to process one of the sections, and to compare an index of one of the packets with another index of one of the packets of a previous one of the sections to check a completeness of the one of the sections when it is received.

6. The receiving device of claim 5, wherein the receiving device is integrated into a video monitoring system.

7. The receiving device of claim 5, wherein the data streams include video data.

8. The receiving device of claim 5,
wherein the receiving device is integrated into a video monitoring system, and wherein the data streams include video data.

9. A method for transmitting data streams, the method comprising:
subdividing the data streams into sections and the sections into packets with a packet assembling device;
providing the sections in a sequence that is the reverse of an original sequence and the packets in an original sequence;
assigning an index characterizing a sequence to each packet, wherein a corresponding index is transmitted with each packet; and
comparing an index of one of the packets with another index of one of the packets of a previous one of the sections to check a completeness of the one of the sections when it is received.

10. The method of claim 9, further comprising:
transmitting the provided sections and packets, wherein the data streams include compressed video data.

11. A method for receiving data streams, the method comprising:
subdividing received data streams into sections and the sections into packets, wherein the sections have a sequence which is the reverse of an original sequence, and the packets have an original sequence; and
providing the images of one of the sections in a reverse sequence by a display module;
wherein an index characterizing a sequence is assigned to each packet during a transmitting process, wherein a corresponding index is transmitted with each packet, and wherein an index of one of the packets is compared with another index of one of the packets of a previous one of the sections to check a completeness of the one of the sections when it is received.

12. The method of claim 11, wherein video data are received and decoded, and wherein the images of one of the sections are stored and displayed in a reverse sequence.

13. A non-transitory computer readable medium having a computer program executable by a processor, comprising:
program code for transmitting data streams by performing the following:
subdividing the data streams into sections and the sections into packets; and
providing the sections in a sequence that is the reverse of an original sequence and the packets in an original sequence;
assigning an index characterizing a sequence to each packet, wherein a corresponding index is transmitted with each packet; and
comparing an index of one of the packets with another index of one of the packets of a previous one of the sections to check a completeness of the one of the sections when it is received.

14. The computer readable medium of claim 13, wherein the provided sections and packets are transmitted, and wherein the data streams include compressed video data.

15. A non-transitory computer readable medium having a computer program executable by a processor, comprising:
program code for receiving data streams by performing the following:
subdividing received data streams into sections and the sections into packets, wherein the sections have a sequence which is the reverse of an original sequence, and the packets have an original sequence; and
providing the images of one of the sections in a reverse sequence;
wherein an index characterizing a sequence is assigned to each packet, wherein a corresponding index is transmitted with each packet, and wherein an index of one of the packets is compared with another index of one of the packets of a previous one of the sections to check a completeness of the one of the sections when it is received.

16. The computer readable medium of claim 15, wherein video data are received and decoded, and wherein the images of one of the sections are stored and displayed in a reverse sequence.

\* \* \* \* \*